July 28, 1959
W. B. PRIDY
2,896,728
COMBINATION POTATO DIGGER AND SORTER
Filed April 5, 1957
4 Sheets-Sheet 2
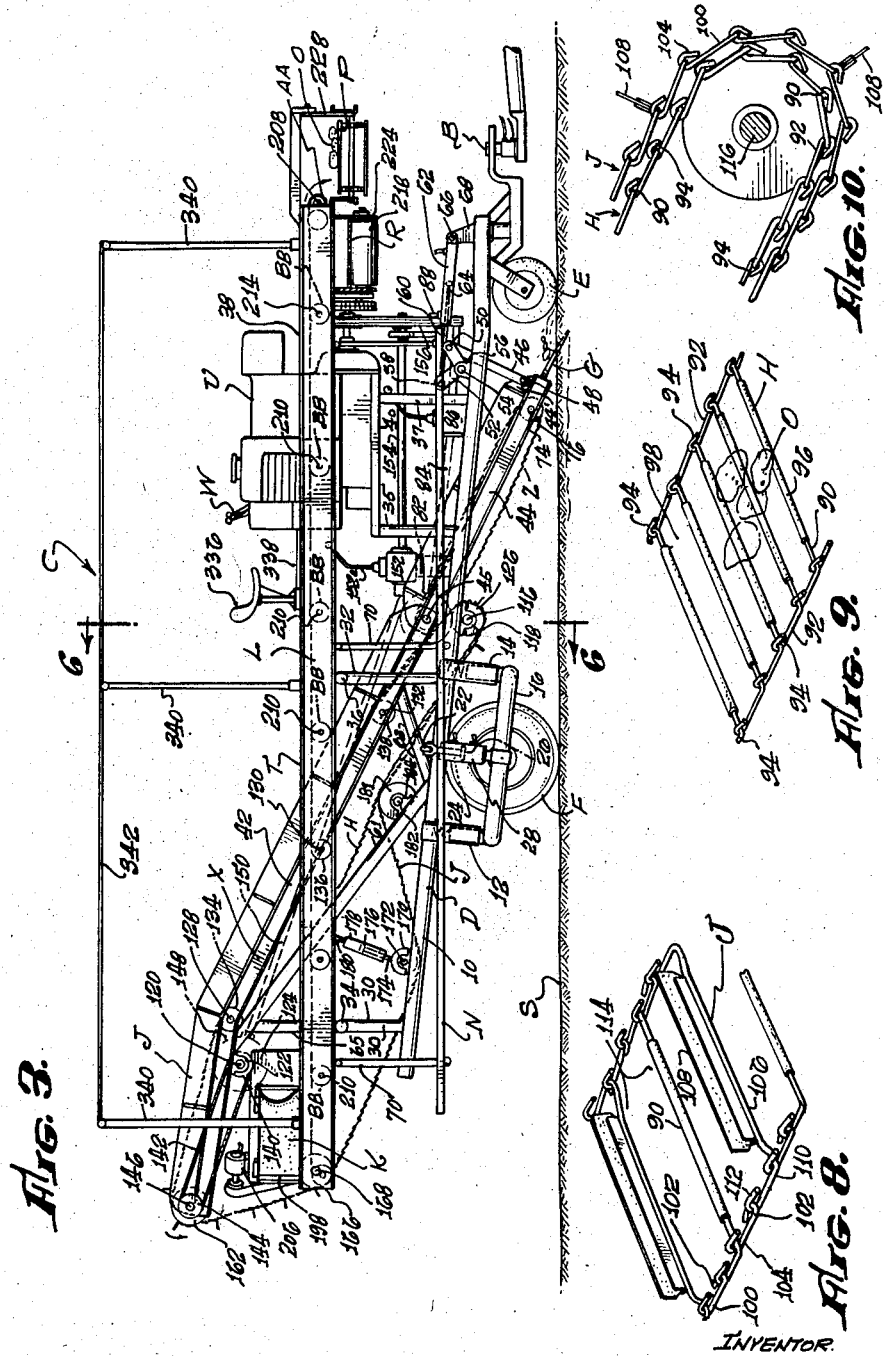
INVENTOR.
WHETSTINE B. PRIDY,
BY William C. Babcock
ATTORNEY.

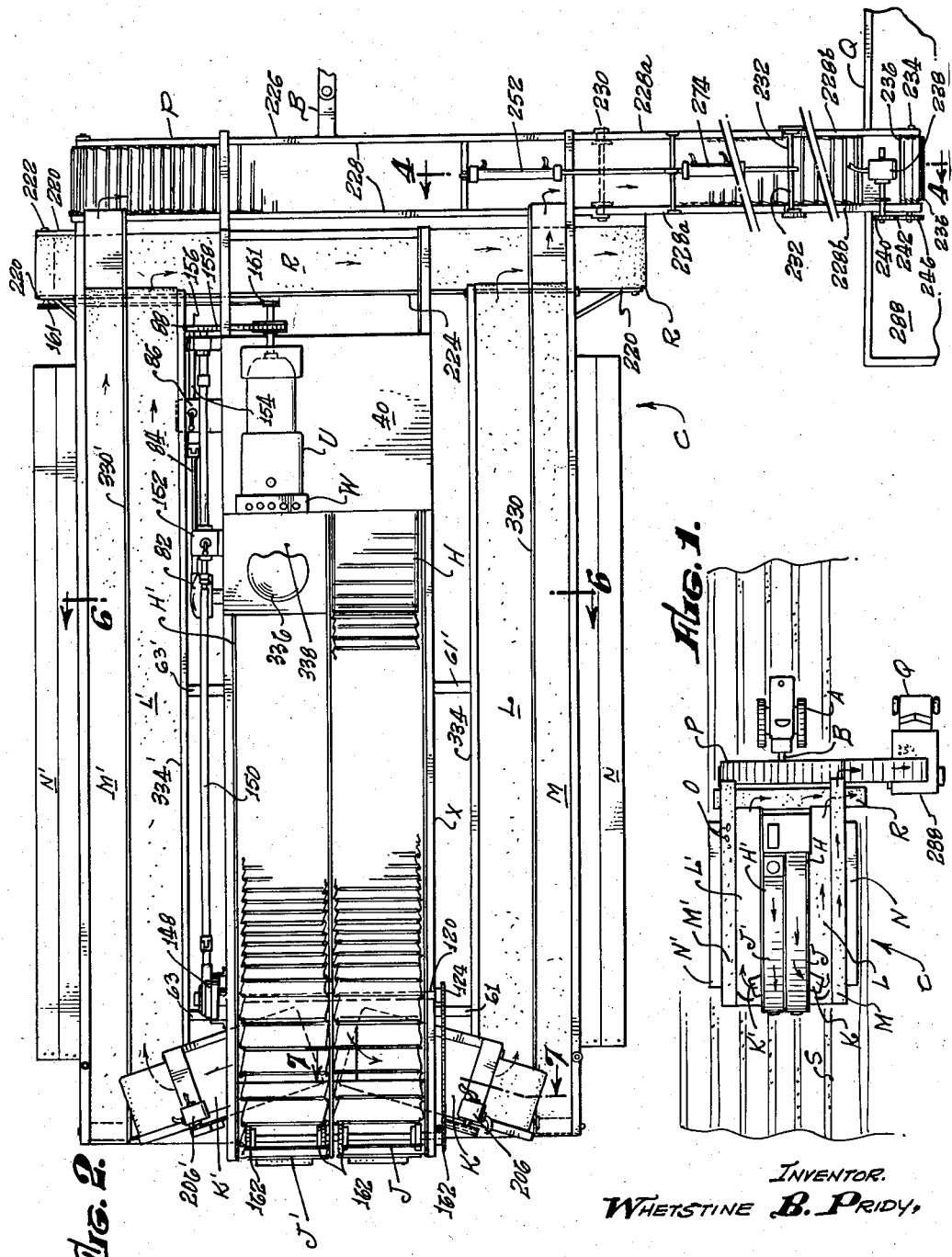

July 28, 1959 W. B. PRIDY 2,896,728
COMBINATION POTATO DIGGER AND SORTER
Filed April 5, 1957 4 Sheets-Sheet 3
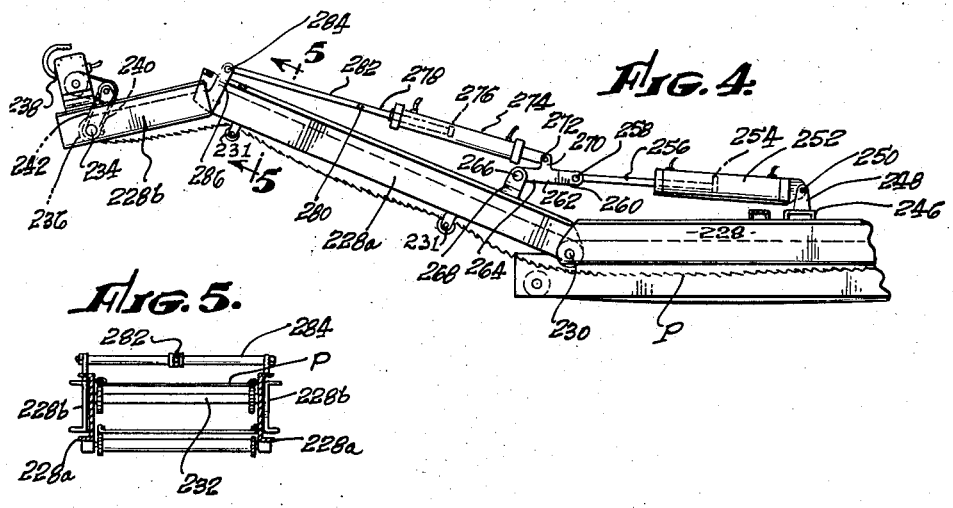
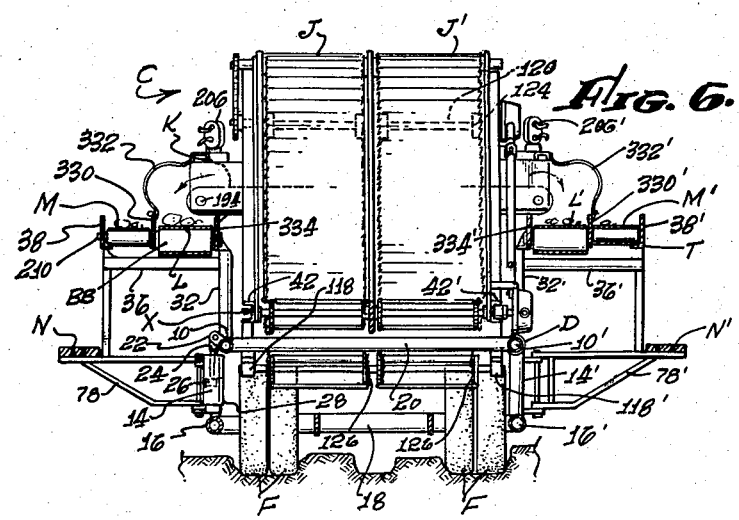
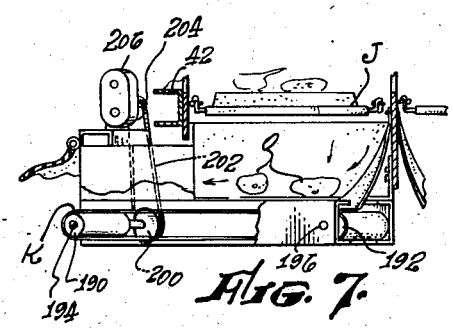
INVENTOR.
WHETSTINE B. PRIDY,
By William C. Babcock
ATTORNEY.

July 28, 1959  W. B. PRIDY  2,896,728
COMBINATION POTATO DIGGER AND SORTER
Filed April 5, 1957  4 Sheets-Sheet 4

WHETSTINE B. PRIDY,
INVENTOR.

By William C. Babcock
Attorney.

United States Patent Office 2,896,728
Patented July 28, 1959

2,896,728

COMBINATION POTATO DIGGER AND SORTER

Whetstine B. Pridy, Oildale, Calif.

Application April 5, 1957, Serial No. 650,952

10 Claims. (Cl. 171—130)

The present invention relates generally to harvesting equipment, and more particularly to a combination potato digging and sorting device. The present application discloses and claims an improvement of the invention disclosed and claimed in my co-pending application Serial No. 542,397 filed on October 24, 1955, entitled Debris and Potato Sorting Device, now Patent No. 2,793,747, issued May 28, 1957.

Large scale raising of potatoes has resulted in the development of a variety of power-operated diggers, and other mechanical implements for use in conjunction therewith for separating the potatoes from the soil as well as vines and other debris as the potatoes are discharged into the machine. Some power-operated potato diggers have been designed, and are now commercially available, that satisfactorily remove the potatoes from the ground, and thereafter either leave them lying above ground or carry the potatoes and debris associated therewith upwardly onto a conveyor belt to be subjected to the action of a separating mechanism. Although commercially available, such equipment has proved to be unsatisfactory in many instances for all or a portion of a potato may be buried in the earth. The density of the encasing soil and potato are so close that heretofore no satisfactory means has been developed to separate one from the other without damage to the surface of the potato during the separating process.

In certain areas, such as that of the San Joaquin Valley, California, it has been a generally accepted practice to use mechanical potato digging equipment which leaves the potatoes exposed on the field to be thereafter manually harvested by laborers who pick them from the ground and sack them.

Separating foreign material from the harvested potatoes is expensive, for the sacked potatoes must be conveyed by truck to the grading sheds before separation, together with hundreds of pounds of useless material clinging thereto, and hauling of this extraneous material is simply a waste operation. A particularly serious disadvantage of hand picking potatoes is that after they are dug, they very often are left on the ground surface for an appreciable length of time, and in such areas as San Joaquin Valley, the exposed potatoes are subject to being burned by the sun before delivery to the grading sheds.

Due to the large scale operation in growing potatoes, a number of attempts have been made in the past to eliminate the disadvantages of manually separating the potatoes from debris clinging thereto by substituting mechanical harvesting devices. However, to date no device has been developed that satisfactorily separates potatoes dug from the earth from associated vines, for to effect such a separation the potatoes are necessarily so roughly handled by the mechanical equipment that the exterior surfaces of the potatoes are damaged. Potatoes damaged in this manner are particularly susceptible to the action of bacteria and molds which precludes satisfactory storage thereof for any length of time. In addition, when the exterior surfaces of potatoes are damaged or defaced they cannot be graded as high as non-damaged potatoes, whereby the grower suffers a financial loss.

The primary purpose in devising the present invention is to provide a device that can be drawn by a tractor to not only dig the potatoes, but immediately thereafter so move the potatoes, clods, vines and other debris which have been dug as to permit sorting of the desired size therefrom and deliver them to a truck or other vehicle driven alongside the device as it progresses through a field.

A major object of the present invention is to not only provide a potato and debris separating device that is shorter and more compact in arrangement than the device disclosed and claimed in pending application, Serial No. 542,397, now Patent No. 2,793,747, but one that digs the potatoes and which, due to its length, can turn on a shorter radius and is more efficient in the field than my previous invention.

Another object of the invention is to provide a potato digging and sorting device that may be easily and quickly moved over public highways from one field to another, is adapted to handle the debris and potatoes produced when two rows of potatoes are concurrently unearthed thereby, and one that is provided with mechanical and hydraulic means whereby the rate at which debris and potatoes are moved by the invention, is completely independent of the rate of speed at which the invention is drawn through the field.

Another object of the invention is to supply a potato digging and sorting device on which the operator of the device is positioned at a sufficiently high elevation that he at all times may observe the movement of the potatoes and associated debris during the sorting operation, the movement of workers manually separating the debris from the potatoes, as well as the operation of transversely disposed conveyor belts projecting from the invention to discharge the sorted potatoes into a truck driving alongside the invention, leaving the debris on the ground to one side of the invention.

A still further object of the invention is to supply a potato digging and sorting device that is of relatively simple mechanical structure, is adapted to be fabricated in lengths sufficient to accommodate the particular number of laborers used in manually separating the debris from the potatoes.

Yet another object of the invention is to provide a potato digging and sorting device by which potatoes may be dug mechanically, and permits efficient use of manual labor in the separation of debris clinging thereto without damage to the potatoes.

A still further object of the invention is to furnish a potato digging and sorting device that permits maximum efficient use of manual labor in that the laborers are transported on the invention as it moves through the field and it is unnecessary for laborers to draw sacks of potatoes behind them as has been common practice heretofore.

These and other objects and advantages of the invention will become apparent from the following description of a preferred form thereof, and from the accompanying drawings illustrating that form in which:

Figure 1 is a plan view of the improved potato digging and sorting device shown drawn by a tractor and delivering the sorted potatoes to a truck traveling alongside the device;

Figure 2 is a detailed top plan view of the device;

Figure 3 is a detailed side elevational view of the device;

Figure 4 is a longitudinal vertical, cross-sectional view of the sorted potato discharge conveyor that extends outwardly from the device, taken on line 4—4 of Figure 2;

Figure 5 is an enlarged vertical transverse cross-sectional view of the sorted potato discharge conveyor taken on line 5—5 of Figure 4;

Figure 6 is a transverse, vertical cross-sectional view of the device taken on line 6—6 of Figure 2;

Figure 7 is a fragmentary, vertical cross-sectional view of a portion of the invention taken on line 7—7 of Figure 2;

Figure 8 is a fragmentary perspective view of a first form of conveyor belt;

Figure 9 is a fragmentary perspective view of a second form of conveyor belt;

Figure 10 is a fragmentary, side elevational view of portions of said first and second conveyor belts driven by a single roller.

Figure 11:
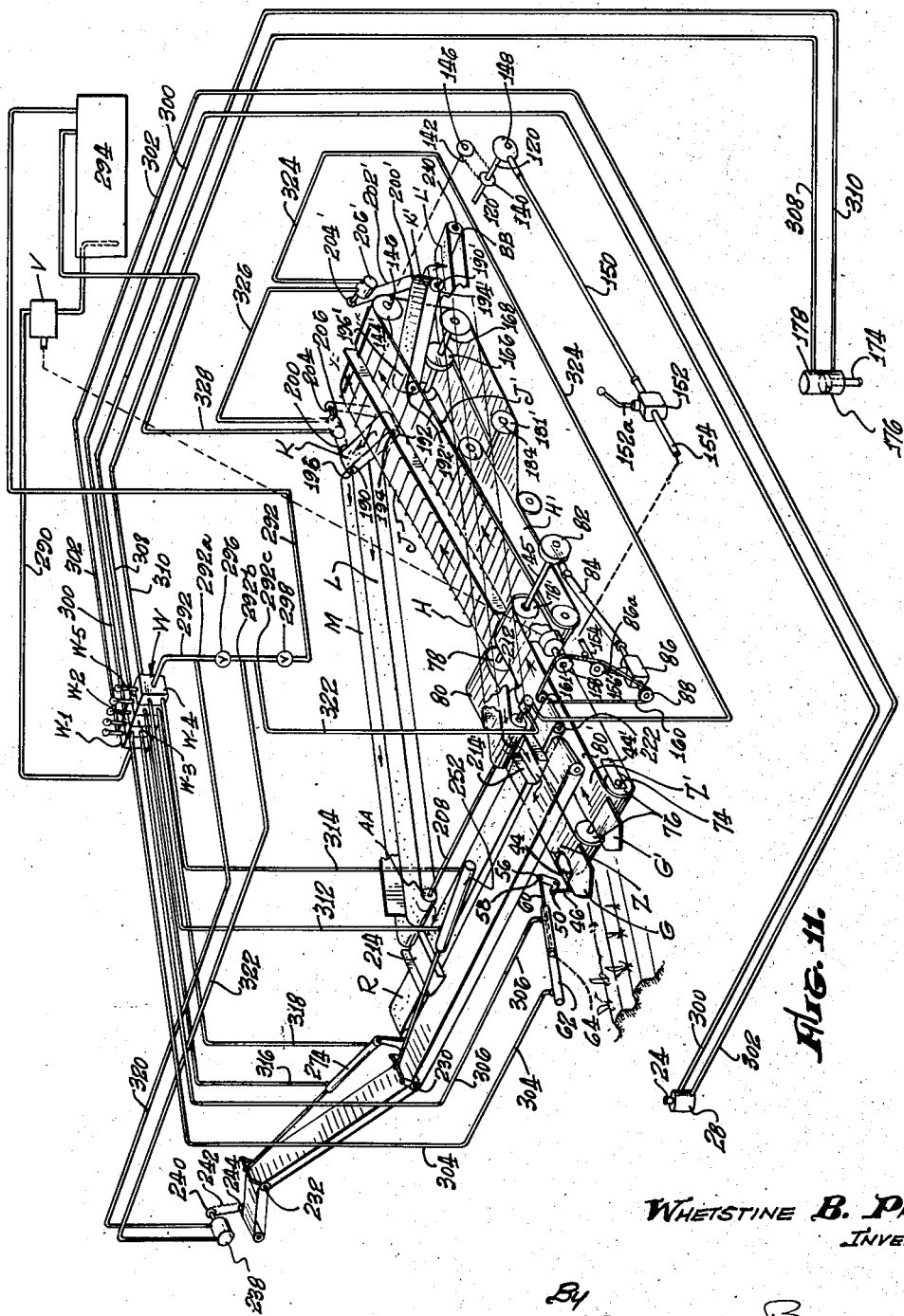
Figure 11 is a diagrammatic perspective view of the invention showing the hydraulic apparatus used in conjunction therewith.

Referring to Figures 1, 2, 3 and 11 of the drawings for the general arrangement of the invention, it will be seen that a tractor A, by means of a traction hitch B, is capable of drawing the combination potato digger and potato sorting device of the present invention, which will be referred to as a whole herein by the letter C, through a potato field. The invention includes an elongate first frame D, the forward end portion of which is movably supported by two pneumatic tired wheels E that are preferably pivotally supported from the frame. The rear of frame D is movably supported by two pairs of wheels F that are larger in diameter than wheels E.

Two laterally spaced potato digging blades G and G' are situated below the forward portion of first frame D (Figures 1 and 11). Potatoes dug by blades G and G', together with vines and other debris associated therewith, are directed by these blades onto first pairs of upwardly and rearwardly extending conveyor belts Z and Z' and thereafter delivered to second and third pairs of endless conveyor belts H, H' and J, J' to be borne rearwardly relative to frame D.

At certain rearward positions on conveyors J, J', potatoes, small clods of earth and other debris fall downwardly through openings formed therein onto fourth pairs of conveyors K, K', which in turn direct them onto two laterally spaced, horizontal fifth endless conveyor belts L, L'. Two sixth parallel, laterally separated endless conveyor belts M, M' are provided which are positioned outwardly from belts L, L' and serve to move sorted potatoes forwardly relative to frame D (Figure 1). Two elongate horizontal platforms N and N' are supported on opposite sides of first frame D adjacent conveyor belts M, M'. Platforms N and N' serve as supports on which workers (not shown) stand when the invention C is in operation and being drawn through the field.

When conveyor belts L, L', M, M' are in motion, the workers manually separate the potatoes O from clods of earth and small vines as deposited on conveyors L, L' and place the sorted potatoes O on conveyors M, M'. The sorted potatoes O are borne forwardly relative to frame D by conveyors M, M' to be deposited in a seventh transversely disposed conveyor, designated generally by the letter P. As best seen in Figures 1 and 3, conveyor P is located on the forward end portion of the invention C and transversely disposed relative thereto. The conveyor P serves to discharge the sorted potatoes into a truck Q which is driven alongside the invention C as it is being moved through a potato field. Soil, vines and other debris left on conveyors L, L' are carried forwardly thereon through a transversely disposed eighth conveyor R positioned alongside conveyor P, with conveyor R serving to discharge waste material delivered thereto onto the ground alongside invention C. That debris too large or bulky to pass through the openings provided in belts J, J' are borne rearwardly therebetween, and discharge onto the ground surface S behind the invention.

Frame D, as shown in Figures 3 and 6, includes two parallel laterally separated downwardly and forwardly extending rigid members 10 and 10'. Each member 10 and 10' is provided with two identical longitudinally spaced substantially vertical shock absorbers 12 and 14, and 12' and 14' depending downwardly therefrom. Shock absorbers 12 and 14 and 12' not shown in the drawings and 14' are connected at their lower ends to cross pieces 16 and 16' respectively, and at substantially the center of these cross pieces a tranversely positioned axle 18 extends therebetween. Axle 18 rotatably supports the pneumatic tired wheels F, which are preferably disposed thereon in pairs to support the relatively heavy structure of the invention. A rigid cross member 20 (Figure 6) is rigidly connected to members 10 and 10' and supports a link 22 which is pivotally connected to the upper end of a piston rod 24 leading downwardly to a piston 26 slidably mounted within the confines of a first hydraulic cylinder 28. The lower end of cylinder 28 is supported from cross piece 16, as best shown in Figures 3 and 6 Movement of piston 26 by means to be explained in detail hereinafter, at all times maintains cross member 20 and frame D of which it forms a part in a horizontal position irrespective of the characteristics of the terrain over which the invention travels, whereby platforms N, N' on which the workers stand are maintained in a horizontal position.

A number of pairs of rigid supports 30, 32, 35 and 37 (Figure 3) project upwardly from frame D. Identical horizontally disposed cross pieces 34 and 36, and 36' are affixed to supports 30 and 32 respectively, projecting therefrom in opposing directions. Two parallel laterally spaced, substantially horizontal rigid members 38 and 38' (Figures 3 and 6) are supported on the upper portions of the pairs of supports 30 and 32, which members serve to define a second frame T, the purpose of which will later be explained. Supports 35 and 37 support a transversely positioned rectangular base 40 on which an internal compustion engine U is mounted that serves to drive various components of the invention, as well as a hydraulic pump V (Figure 11) which provides hydraulic fluid under pressure to actuate various components of the invention by means of a valve control box W, as will hereinafter be explained in detail.

A third frame X is defined by two laterally spaced downwardly and forwardly extending rigid members 42 and 42' as best shown in Figures 3 and 6. Frame X is provided with forwardly located extensions 44 and 44' on opposed side and not shown to which the digging blades G and G' are rigidly affixed. Extensions 44 and 44' are pivotally connected by a transversely disposed shaft 45 to members 42, 42', as best seen in Figure 3. A link 46 is pivotally connected by a pin 48, or other suitable means, to the blade-supporting structure 44, and the upper end of this link is pivotally connected to one leg of a bell crank 52. A pin 54 pivotally mounts bell crank 52 in a journal box 56 affixed to first frame D, and the opposite leg of crank 52 is movably connected at 58 to a piston rod 60 extending into the confines of a second hydraulic cylinder 62 to a piston 64. Cylinder 62 is pivotally connected by a pin 66, or other suitable fastening means, to a first bracket 68 that projects upwardly from the forward end portion of frame D.

Frame X is rigidly supported from the first frame D by two identical pairs of angularly disposed supports 61, 63 and 61', 63', as well as two identical extensions one of which is shown at 65, of supports 30. Platforms N, N' (Figures 3 and 6) are supported by a number of identical L-shaped brackets 70 and 70' that depend from second frame T.

Extension members 44, 44' (Figures 3 and 11) rotatably support a transversely disposed shaft 74 on which two laterally spaced first rollers 76 and 76' are mounted. Two laterally spaced second rollers 78, 78' are rigidly affixed to the transverse shaft 45 in alignment with rollers 76, 76'. Rollers 76, 78 and 76', 78' rotatably support the two upwardly and rearwardly extending first conveyor belts Z, Z', respectively, onto which potatoes are delivered by digger blades G, G'. Shaft 45, as can best be seen in Figure 11, is connected to a first differential 82 from which a driving shaft 84 extends to a first transmission 86 that is driven by a belt-engaging pulley 88.

The second endless conveyor belts H, H', which are identical as shown in Figure 9, include a number of parallel, transversely disposed, rigid cross members 90, the ends of which develop into two identical parallel legs 92 that terminate in eyes 94. Eyes 94 pivotally engage the cross member 90 adjacent thereto. To prevent damage to potatoes carried by cross members 90, tubes 96 of a softer material are preferably mounted on these members. Cross members 90 define elongate rectangular spaces 98 therebetween that are too small in area for potatoes O being sorted to fall therethrough.

Cross members 90 with legs 92 and eyes 94 are also utilized in the fabrication of identical conveyor belts J, J'. In addition to cross members 90, links 100 are provided that have eyes 102 and 104, respectively, formed on the ends thereof. Second cross members 106 are also provided in which flights 108 are formed that extend upwardly therefrom. Cross members 106 are formed with identical parallel legs 110, the ends of which terminate in eyes 112. Eyes 102 pivotally interlock with eyes 112, and eyes 104 pivotally interlock with cross member 90 to provide an endless belt in which cross members 90 are positioned between cross members 106 and flights 108 supported thereby. Cross members 90 and 106 define rectangular spaces 114 therebetween that are larger in area than spaces 98 to permit potatoes O, clods of soil and small pieces of vines and other debris to drop therethrough.

A second transversely disposed shaft 116 is rotatably supported in two identical first journal boxes 118, 118' mounted on members 10, 10' directly under shaft 45. A third transverse shaft 120 is rotatably supported in two identical journal boxes 122, only one of which is shown, mounted on the upper rear portion of third frame X. Shaft 120 has four laterally spaced driving sprockets 124 rigidly mounted thereon that engage both conveyor belts H, H' and J, J'. Shaft 116 also has four laterally spaced sprockets 126 similar to driving sprockets 124 mounted thereon that are concurrently engaged by conveyor belts H, H' and J, J'. Three transverse, longitudinally spaced shafts 128, 130 and 132 are rotatably supported by frame X, with each shaft having four idling sprockets 134, 136 and 138, respectively, mounted thereon that engage conveyor belts H, H' and J, J' to support same in upwardly and rearwardly extending positions.

A driving pulley 140 is rigidly affixed to shaft 120 and is engaged by an endless belt 142 extending to a driven pulley 144 rigidly connected to a transversely supported shaft 146 that is rotatably supported by the upper portions of members 42, 42'. Shaft 120 forms a part of a second differential 148 from which a second driving shaft 150 extends to a second differential 152. Shaft 150 is actuated by differential 152 from which a shaft 154 projects that supports a pulley 156. An engine U is provided having a driving belt 158 associated therewith that serves to drive pulleys 88, 156, and a pulley 161, the purpose of which will be explained hereinafter. Thus, by means of a handle 86a, the gears (not shown) in transmission 86 can be adjusted to provide any one of a number of speeds for first conveyor belts Z, Z', and a second handle 152a associated with second transmission 152 also permits the second and third conveyor belts H, H' and J, J' to be driven at any one of a number of different speeds.

Belts J, J' separate from belts H, H' after passing over sprockets 124, with belts J, J' leading upwardly and rearwardly to engage four laterally spaced sprockets 162 mounted on shaft 146 and rigidly affixed thereto. Conveyor belts J, J' extend downwardly and forwardly from sprockets 162 to four laterally spaced sprockets 166 mounted on a transversely disposed horizontal shaft 168 supported between members 38, 38'.

Four laterally spaced idling sprockets 170 are mounted on a transverse shaft 172 that is supported on the lower end of a piston rod 174 extending upwardly to a piston 176 which is slidably mounted within the confines of a third hydraulic cylinder 178. Cylinder 178 is supported in a depending position from a transversely positioned rod 180 that extends between, and is affixed to members 38, 38' of second frame T. By discharge of hydraulic fluid to cylinder 178, as will hereinafter be explained, sprockets 170 can be utilized to place the desired tension on conveyor belts J, J'.

Four laterally spaced sprockets 181, 181' are mounted on a transverse shaft 182, the ends of which are rotatably supported in two identical journal boxes 184 that are conveniently located and mounted on a portion of the supports for third frame X as shown in Figure 3. Sprockets 181, 181' (Figure 3) are concurrently engaged by conveyor belts H, H' and J, J', with these belts thereafter traveling forwardly to sprockets 126.

When shaft 120 is caused to rotate, potatoes, debris, vines and other foreign material are moved upwardly and rearwardly by the second and third conveyor belts J, J' and H, H'. Due to the spacing of cross members 90, belts H, H' permit potatoes of only the desired size being sorted to pass through openings 114 formed in conveyors J, J' after the belts have separated at sprockets 124. Potatoes to be sorted, the larger clods of soil, and smaller vines fall through openings 114 onto the fourth pair of endless conveyor belts K, K' which are relatively short and are disposed at a slight angle. Conveyor belt K is rotatably supported on two spaced rollers 190 and 192 that are mounted on shafts 194 and 196, respectively, which shafts are maintained in the desired fixed relationship on the rear portion of member 38. Belt K' is rotatably supported on spaced rollers 190' and 192' that are mounted on shafts 194' and 196', respectively, which shafts are maintained in the desired fixed relationship on the rear portion of member 38'.

The shafts 194, 194' have driven pulleys 200, 200', respectively, mounted thereon that are engaged by endless belts 202, 202' that extend to pulleys 204, 204' on a first pair of hydraulic motors 206, 206'. The means by which hydraulic fluid is delivered to motors 206, 206' will later be described in detail.

A transversely disposed driving shaft 208 shown in Figure 3 is rotatably supported between the forward end portions of members 38, 38' (Figures 3 and 11) and four laterally spaced rollers AA are rigidly mounted thereon that drivingly engage the forward end portions of conveyor belts L, L' and M, M'. A number of idling rollers BB of the same transverse positioning as rollers AA are longitudinally spaced between members 38 and 38' (Figure 3) and supported on a plurality of shafts 210 to maintain belts L, L' and M, M' substantially horizontal. Shaft 208 is driven by a third hydraulic motor 212, as shown in Figure 11.

The forward extent of belts L, L' and M, M' terminate at the rear edge of the eighth conveyor belt R. Two downwardly and forwardly extending chutes 214, 214' receive sorted potatoes O from conveyors M, M', respectively, and deliver same to the seventh conveyor belt P, as best seen in Figures 2, 3 and 11. Belts L, L' and M, M' are preferably formed of flat, resilient material, but it is desirable that conveyor P be of the same structure as belt H shown in Figure 9.

Belt R is also fabricated from a flat resilient sheet material and is supported on a number of transversely disposed rollers 218 that are longitudinally spaced and journaled in two parallel, separated rigid members 220 affixed to the forward portion of second frame T. One of the rollers 218 has a shaft 222 which projects through one of the members 220, and this projecting shaft has the driven pulley 161 mounted thereon (Figures 2 and 11). Pulley 161 is driven by belt 160. The two rigid members 220 comprise a fourth frame 224.

A fifth transversely disposed frame 226 is affixed to frame T forwardly of frame 224, and is defined by two parallel, laterally spaced rigid members 228. At one extremity of members 228 (Figures 2 and 4) a shaft 230 extends transversely therebetween and pivotally supports two laterally separated first extension members 228a. A transverse shaft 232 extends between the outer ends of members 228a and pivotally supports two laterally separated second extension members 228b. Members 228b rotatably support a transverse shaft 234 that has two identical sprockets 236 mounted thereon which engage conveyor belt P. A fourth hydraulic motor 238 is mounted on extension members 228b, which motor is provided with a driving pulley 240 that engages a belt 242. Belt 242 engages a driven pulley 236 affixed to shaft 234.

A cross piece 246 extends between members 228 (Figure 4) from which a lug 248 projects upwardly that supports a pin 250. Pin 250 is pivotally connected to one end of a fourth hydraulic cylinder 252 in which a piston 254 is slidably mounted. Piston 254 is rigidly affixed to a piston rod 256 and its free end is pivotally connected by a pin 258 to a first leg 260 of a T-shaped rigid member 262. A second leg 264 of member 262 is pivotally connected by a pin 266 to a lug 268 that is affixed to one of the first extension members 228a. Member 262 has a third leg 270 which by means of a pin 272 is pivotally connected to one end of a fifth hydraulic cylinder 274 having a piston 276 slidably mounted within the confines thereof. Piston 276 is rigidly affixed to a piston rod 278 that is pivotally connected by a pin 280 to a rod extension 282 that terminates in a pin 284. Pin 284 is connected to a pair of lugs 286 which are rigidly affixed to extension members 228b. Movement of piston 276 by means to be later explained, causes extension frame 228a of frame 228 to pivot to a position where sorted potatoes O can be discharged into the carrying portion 288 of truck Q. When piston 276 is moved by means that will also be later explained, the second extension frame members 228b can be moved to a position to minimize the distance the potatoes O will drop when discharged into the truck Q. Belt P is rotatably supported between members 228, first extensions 228a, and second extensions 228b by a number of conventionally mounted idling sprockets 231.

Engine U by conventional means drives a master pump V that has a discharge line 290 extending therefrom to a bank of valves W. For clarity of description herein, valves W are further identified individually by the notations W-1, W-2, W-3, W-4 and W-5. These valves are manually operable and are of the type that when in first positions, permit fluid to pass therethrough without obstructing a line 292 terminating in a reservoir 294.

Two lines 300 and 302 lead from valve W-1 to first hydraulic cylinder 28 to move the piston 26 therein in the desired direction and maintain first frame D in a horizontal plane, irrespective of the slope or nature of the terrain over which the invention travels. When valve W-1 is in a second position, fluid is permitted to enter cylinder 28 through line 300 and discharge from the cylinder through line 302. However, when valve W-1 is in a third position, the direction of fluid flow in lines 300 and 302 is reversed. Thus, by manual manipulation of valve W-1 between the second and third positions, positioning of piston 26 and first frame D can be readily controlled.

Valve W-2 has two lines 304 and 306 extending therefrom to second cylinder 62 to control the movement of piston 64 and the positions of digger blades G, G' together with the third frame extensions 44 supporting same.

Valve W-3 has two lines 308 and 310 connected thereto extending to the third hydraulic cylinder 178 to cause movement of piston 176 and place the desired amount of tension on conveyor belts J, J'.

Two lines 312 and 314 extend from the fourth hydraulic cylinder 252 to valve W-4 to permit the desired movement of piston 254 and pivotal adjustment of first extensions 228a of the fifth frame 228.

Valve W-5 is connected by two lines 316 and 318 to the fifth hydraulic cylinder 274 which permits control of the position of piston 276 and the second frame extensions 228b of frame 228.

A fluid discharge lateral 320 extends from line 292 at junction point 292a to hydraulic motor 238. A fluid return lateral 322 extends from motor 238 and enters line 292 at junction point 292b. A manually operable valve 296 is disposed in line 292 between junction points 292a and 292b. At junction point 292c, line 292 has a lateral 322 extending therefrom to hydraulic motor 212, which motor rotates conveyor belts L, L' and M, M'. Downstream from junction point 292c, line 292 is provided with a throttling valve 298 which is used to control the rate of flow of hydraulic fluid into line 322.

After discharge from motor 212, hydraulic fluid enters a line 324 that extends to hydraulic motor 206', which motor rotates conveyor K, as can best be seen in Figure 11. A line 326 conducts hydraulic fluid discharged from motor 206' to motor 206, which latter motor rotates conveyor belt K. After flowing through hydraulic motor 206 this fluid enters a line 328 and discharged into reservoir 294.

Frame T (Figure 6) includes two parallel, elongate dividing members 330, 330' located between conveyor belts M, L and M' and L', respectively, to prevent inadvertent mixing of sorted potatoes O with trash and debris carried on conveyor belts L, L'. Guards or shields 332, 332' project upwardly and inwardly from rearwardly disposed portions of dividing members 330, 330', respectively, to direct both potatoes and trash carried by conveyors K, K' onto conveyors L, L'. Two elongate longitudinally extending side rails 334, 334' also form a part of frame T and are disposed along the inner edges of conveyors L, L', respectively, to prevent potatoes rolling therefrom.

An operator's seat 336 is provided in a position convenient for operation of valves W as shown in Figure 3, and is supported on a platform 338 that is affixed to second frame T by conventional means.

When the invention is to be used in hot climates such as found in the San Joaquin Valley, Calif., it is desirable that a number of uprights 340 be affixed to the frame T and used to support a longitudinally extending sun shield 342.

In use, the operation of the invention is extremely simple. The invention is hitched to a tractor A and the engine U thereafter started. The truck Q is required to be driven alongside the invention during the potato digging operation. Upon initiation of the digging operation, valve W-2 is manipulated to place digger blades G, G' and third frame extension members 44, 44' in the desired positions relative to the ground surface. Transmission lever 86a is adjusted to drive first conveyor belts Z, Z' at the proper speed to discharge the unearthed potatoes, together with soil, vines, etc. onto second and third conveyor belts H, J and H', J' respectively. Transmission lever 152a is utilized to actuate transmission 152 to drive second and third conveyor belts H, J and H', J' at the desired speed whereby the material delivered thereto may be moved by conveyors Z, Z' rearwardly relative to second frame T. As previously explained, hydraulic fluid from pump V causes rotation of conveyors K, K', M, M' and L, L', as well as conveyor R. The laborers (not shown) standing on platforms N, N' manually sort potatoes O from the trash on conveyors L, L' and deposit same on the forwardly moving conveyors M, M'. The manner by which potatoes and trash is deposited on conveyors K, K' has previously been discussed in detail and need not be repeated herein.

After the sorted potatoes are carried forwardly on belts M, M' to a predetermined position, they are deposited on conveyor P, which in turn transports them to truck Q as previously described. Trash remaining on conveyors L, L' is carried forwardly to conveyor belt R where it is deposited and subsequently dumped thereby alongside the invention. Long, stringy vines that are too massive to fall through openings 114, as shown in Figure 8, are discharged from the rear of the invention by belts J, J'

Although the form of the invention herein shown and described is fully capable of achieving the objects and providing the advantages hereinbefore mentioned, it is to be understood that it is merely illustrative of the presently preferred embodiment thereof and that I do not mean to limit myself to the details of construction herein shown and described other than as defined in the appended claims.

I claim:

1. A potato digging and sorting device adapted to be drawn by power means, including: frame means; wheel means that movably support said frame means; digging means supported from said frame means; first conveyor means supported on said frame means that is adapted to receive potatoes and debris unearthed by said digging means; second open-work, endless belt conveyor means supported on said frame means that receives said potatoes and debris and moves same rearwardly from said digging means; third open-work, endless belt conveyor means having an upwardly disposed first portion adjacent the underside of the uppermost longitudinal portion of said conveyor means; said third conveyor means having a second portion that extends rearwardly from said second conveyor means, said first portion and upper longitudinal portion cooperating to support potatoes and debris thereon, but said second portion permitting potatoes and debris deposited thereon from said conveyor means to fall downwardly therethrough; fourth conveyor means mounted on said frame means below said second portion of said third conveyor means that receive said potatoes and debris therefrom and move same transversely relative to said frame; fifth conveyor means mounted on said frame means that receives said potatoes and debris from said fourth means and moves said potatoes and debris in a direction opposite that in which said potatoes and debris moved when on said third means; sixth conveyor means mounted on said frame that is parallel to and adapted to move in the direction as said fifth means; support means that are affixed to said frame means, on which support means laborers stand to manually sort said potatoes from said debris and place said sorted potatoes on said sixth means; seventh conveyor means transversely mounted on said frame means and adapted to receive said sorted potatoes from said sixth means to deliver same at a predetermined position alongside said frame means; eighth conveyor means transversely mounted on said frame means, which eighth means is adapted to receive debris from said fifth means and discharge same outwardly to one side of said frame means; and power means that selectively drive said conveyor means at desired speeds.

2. A potato digging and sorting device as defined in claim 1 wherein said frame means comprises a first horizontally disposed frame supported by said wheel means, a second frame supported by said first frame, a third frame supported by and extending downwardly and forwardly relative to said first frame, and said digging means is mounted on the forwardmost extremity of said third frame.

3. A potato digging and sorting device as defined in claim 2 wherein said third frame is provided with a forwardly disposed extension that is pivotally supported from a rearwardly disposed portion of said third frame, which extension supports said digging means thereon, and adjustable means that holds said extension at a desired angle relative to said first frame.

4. A potato digging and sorting device as defined in claim 3 in which first, second, third, fourth and fifth valves are provided together with means to supply hydraulic fluid under pressure thereto, with said adjustable means being a first hydraulic cylinder connected to said first valve, which valve when manually operated causes said hydraulic fluid to discharge to, and actuate said cylinder.

5. A potato digging and sorting device comprising: a wheel-supported tractor-drawn frame including a potato plant digger structure having spaced digger blades and adjacent potato and debris receiving and advancing conveyors; dual sets of rearward upwardly inclined, concurrently moving, overlapping conveyor mechanisms that are aligned with said potato plant digger structure, said dual conveyor mechanisms including one set of open-work conveyor members for elevating potatoes and sorting debris; a second set of conveyor members having wider spaced openings that continue beyond said first named set of conveyors to initially sort said potatoes automatically as to desired size; a pair of forwardly moving inner conveyors adapted to receive said potatoes and debris from said continuing set of open-work conveyors; a second pair of forwardly moving conveyors disposed adjacent to an outwardly relative to said first named forwardly moving conveyors that provide constant delivery means for potatoes that are manually sorted from said inner conveyors; and power means that selectively drive said conveyor mechanisms at pre-determined speeds.

6. A potato digging and sorting device comprising: a wheel-supported tractor-drawn frame including a potato plant digger structure having spaced digger blades and adjacent potato and debris receiving and advancing conveyors; dual sets of rearward upwardly inclined, concurrently moving, overlapping conveyor mechanisms that are aligned with said potato plant digger structure, said dual conveyor mechanisms including one set of open-work conveyor members for elevating potatoes and sorting debris, and a second set of conveyor members having wider spaced openings that continue beyond said first named set of conveyors to initially sort said potatoes automatically as to desired size; a pair of forwardly moving inner conveyors adapted to receive said potatoes and debris from said continuing set of open-work conveyors; a pair of forwardly moving conveyors disposed adjacent to and outwardly relative to said first named forwardly moving conveyors providing constant delivery means for those potatoes which are manually sorted from said inner conveyors; a forwardly disposed transverse conveyor extending laterally beyond said frame structure that receives and delivers said manually sorted potatoes to an accompanying movable vehicular element; and power means that selectively drives said conveyor mechanisms at desired speed.

7. A potato digging and sorting device as set forth in claim 6 which includes potato and debris collecting conveyors disposed beneath said second set of wider spaced conveyors adapted to transmit sorted potatoes and debris to said pair of inner conveyors.

8. A potato digging and sorting device as defined in claim 7 wherein a second forwardly disposed transverse conveyor receives debris from said inner pair of forwardly moving conveyors and discharges same laterally of said frame structure.

9. A potato digging and sorting device as defined in claim 8 wherein said forwardly disposed transverse conveyor extends laterally beyond said frame structure and includes mechanism for adjustably controlling the elevated position of the outer delivery end thereof.

10. A potato digging and sorting device as defined in claim 9 wherein said forwardly disposed transverse conveyor extends laterally beyond said frame structure and includes a manually adjustably controlled outer conveyor extension that provides gentle, final potato delivery to an accompanying vehicular element.

References Cited in the file of this patent

UNITED STATES PATENTS

| | | |
|---|---|---|
| 1,800,622 | Granberg | Apr. 14, 1931 |
| 1,975,668 | Rodin | Oct. 2, 1934 |
| 2,453,714 | Lapointe | Nov. 16, 1948 |
| 2,706,878 | Dahlman | Apr. 26, 1955 |
| 2,724,226 | Askviken et al. | Nov. 22, 1955 |
| 2,793,747 | Pridy | May 28, 1957 |